May 12, 1959 E. O. BLODGETT ET AL 2,886,159
PRINTING MACHINE FOR TRANSLATING CODED INFORMATION
WITH CONVERSION BETWEEN CODE LEVELS
Filed Feb. 27, 1956 11 Sheets-Sheet 1

*INVENTORS*
EDWIN O. BLODGETT
*BY* WILBUR C. AHRNS
ATTORNEY

May 12, 1959 E. O. BLODGETT ET AL 2,886,159

PRINTING MACHINE FOR TRANSLATING CODED INFORMATION WITH CONVERSION BETWEEN CODE LEVELS

Filed Feb. 27, 1956 11 Sheets-Sheet 2

| LETTER SHIFT POSITION | CODE | | | | | FIGURE SHIFT POSITION |
|---|---|---|---|---|---|---|
| | 1 | 2 | 3 | 4 | 5 | |
| A | X | X | | | | — |
| B | X | | | X | X | $ |
| C | | X | X | X | | N. P. CODE |
| D | X | | | X | | TAB. |
| E | X | | | | | 3 |
| F | X | | X | X | | |
| G | | X | | X | X | & |
| H | | | X | | X | |
| I | | X | X | | | 8 |
| J | X | X | | X | | ERROR |
| K | X | X | X | X | | P. R. CODE |
| L | | X | | | X | |
| M | | | X | X | X | . |
| N | | | X | X | | , |
| O | | | | X | X | 9 |
| P | | X | X | | X | 0 |
| Q | X | X | X | | X | 1 |
| R | | X | | X | | 4 |
| S | X | | X | | | / |
| T | | | | | X | 5 |
| U | X | X | X | | | 7 |
| V | | X | X | X | X | PUNCH OFF |
| W | X | X | | | X | 2 |
| X | X | | X | X | X | |
| Y | X | | X | | X | 6 |
| Z | X | | | | X | |
| CARRIAGE RET. | | | | X | | CARRIAGE RET. |
| SPACE | | | X | | | SPACE |
| ——— | X | X | X | X | X | LETTERS SHIFT |
| FIGURES SHIFT | X | X | | X | X | ——— |
| ON 2 L.F. | | X | | | | ON 1 |
| STOP CODE | | | | | | STOP CODE |

FIG. 6

May 12, 1959 E. O. BLODGETT ET AL 2,886,159

PRINTING MACHINE FOR TRANSLATING CODED INFORMATION WITH CONVERSION BETWEEN CODE LEVELS

Filed Feb. 27, 1956 11 Sheets-Sheet 4

United States Patent Office 2,886,159

Patented May 12, 1959

2,886,159

PRINTING MACHINE FOR TRANSLATING CODED INFORMATION WITH CONVERSION BETWEEN CODE LEVELS

Edwin O. Blodgett and Wilbur C. Ahrns, Rochester, N.Y., assignors to Commercial Controls Corporation, Rochester, N.Y., a corporation of Delaware

Application February 27, 1956, Serial No. 568,011

41 Claims. (Cl. 197—20)

The present invention relates to printing machines for translating functional-control and character-print information and, particularly, to such machines which develop for recording in a record medium coded information required to duplicate printed copy or which respond to such recorded information to reproduce printed copy or both. While the invention is of general application, it has particular utility in connection with punched or perforated tape recording and reproducing printing machines and will be described in that connection.

Tape controlled printing machines are in widespread use for preparing repetitive copy. A printing machine of this nature is the subject of United States Patent No. 2,700,446, granted January 25, 1955 to Edwin O. Blodgett. An improved printing machine of this type is disclosed in a copending application Serial No. 535,497, filed September 20, 1955, in the names of Edwin O. Blodgett and Wilbur C. Ahrns, entitled Writing Machine and assigned to the same assignee as the present application. In the latter machine, manual operation of the printing machine key levers not only produces written copy but also automatically actuates a code selector by which each key lever and certain functional controls may be identified by preselected codes of binary code form. This coded information may then be supplied to a tape punch which punches each character or functional code group into a tape, and the punched tape may then be used in a tape reading device to control through a code translator functional-control and character-print key levers automatically to reproduce written copy conforming to the information recorded in the punched tape.

The Blodgett et al. application last mentioned enables certain programming operations by which to punch character-print and functional-control information selectively into either one or both of two tapes. This may be accomplished in accordance with information read from a punched tape, or resulting from manual keyboarding operations of the writing machine, or resulting from a composite of both types of such information. In this manner, punched tapes may be created which have special utility in the preparation of form documents by which to effect exceptionally high rates of speed and extreme accuracy in reproducing of invariable information involved in the document preparation and thereby reduce manual keyboarding operations to those required for insertion of variable information into the document. Since both the automatic and operator control of the printing machine is by key lever actuation, coded information required to duplicate the printed documents may (concurrently with printing of the document) be punched into a second or byproduct tape if desired.

In accomplishing programmed operations of the type last described, the printing machine includes in a self-contained unit both recorder and reproducer structures which may be operated individually or concurrently, a single source of driving power being used to insure necessary operating synchronizations of related operating functions while enhancing increased flexibility and ease of operation. For programmed operations of the type described, manual control over the initiation and termination of a tape reading operation, or automatic termination and manual initiation of such operation, are provided for enhancing the nature and scope of the programmed operations. This is also true of manual and automatic selection as between either or both of two information recorders which provide second or byproduct recordings. To permit recording of special functional codes, provision is also made for both manual nonprint and print-restore functional operations, and for both manual and automatic deletion of selected lines of copy information.

The amount of functional-control and character-print information required to duplicate printed copy with program control is sufficiently extensive that the printing machine disclosed in the aforementioned Blodgett et al. application uses an eight bit or eight level binary code for all recorded information. It is frequently desirable to transmit such recorded information to a remote point by wire, but the transmission of an eight level code involves either a special form of telecommunication system or some form of code conversion and reconversion system by which to convert the eight level code to a five level one suitable for translation by standard five level telecommunications transmitting and receiving code equipment. Such special eight level telecommunication systems are relatively expensive, must be in the nature of custom installations and therefore are not widely available, and require the use of especially designed equipment. The matter of code conversion from eight level to five level for transmission, and reconversion from five level to eight level for utilization at the receiving point, is not easily and readily accomplished and also involves the use of equipment especially designed for that purpose.

It is an object of the present invention to provide a new and improved record-medium-controlled printing or writing machine having full program control functions yet one which operates on a five level code basis so that functional-control and character-print recorded information may be readily transmitted by wire to a remote point and received by standard telecommunications systems.

It is a further object of the invention to provide a novel record-medium-controlled printing or writing machine using five level code for programmed operations and one which greatly expands the information handling capacity by effectively operating on the basis of a six level code without actually exceeding the five levels available for recording purposes.

It is an additional object of the invention to provide a recording and reproducing printing or writing machine wherein certain information ambiguity occasioned by use of a simplified code having multiple dual-information codes of identical code form is resolved by mechanical interpretation performed by the machine as a result of one of its mechanical operations.

It is another object of the invention to provide a novel recording and reproducing printing or writing machine wherein all character-print and functional-control operations are performed in the alternative in two groups thereof with reliable and consistent mechanical interlock against erroneous occurence of simultaneous operations in both groups.

It is a further object of the invention to provide a recording and reproducing printing or writing machine having a recorded information reader and one or more information recorders and one wherein nonprint and print-restore controls of the machine during information reading intervals are effected mechanically through control of a code translator. Each such nonprint control effects automatic transfer of the input of each information recorder to the output of the information reader, and selection of either or both of two information recorders continues under control of read information even though the machine is not printing.

Other objects and advantages of the invention will appear as the detailed description thereof proceeds in the light of the drawings forming a part of this application and in which:

Fig. 6 represents a suitable code for use in a printing machine embodying the invention;

*Key lever mechanical interlock construction*

Figure 1:
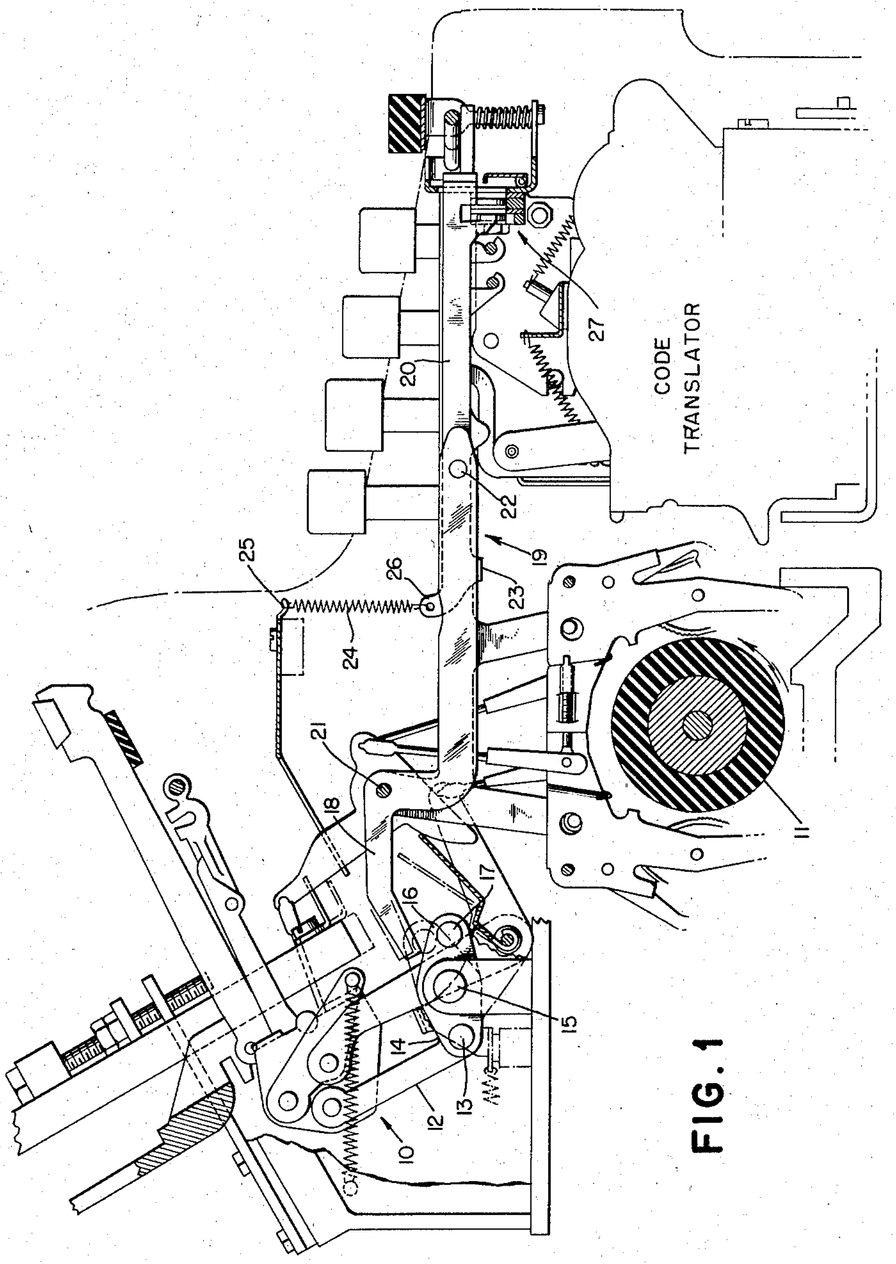
Fig. 1 illustrates in elevational end view the general arrangement of a key-lever actuated printing machine embodying a representative lock lever mechanical interlock structure used in the present invention, and Figs. 2–5, inclusive, are fragmentary views of certain details of construction of this interlock structure.

In a printing machine embodying the present invention, all character-print and functional control key levers are included in individual ones of two groups with approximately equal numbers of key levers in each group. With the exception of the carriage return key lever and space key lever, which may be operated with both groups of key levers, the groups of key levers are mechanically so interlocked that only the key levers of a selected group may be operated at any given time. Key lever group selection is effected mechanically by the position of the type basket in what may be called its "Letters" or "Figures" position; that is, when the type basket is in its "Letters" position only the "Letters" group of key levers may be manually or automatically actuated whereas with the type basket in its "Figures" position only those key levers in the "Figures" group may be manually or automatically actuated. In addition, the key levers of each group are mechanically interlocked against simultaneous actuation of any two key levers within the group.

Concurrent with the mechanical key lever group interlock operation last described, a code translator slide is also actuated by the positioning of the type basket in its "Figures" position by which mechanically to add a "sixth level" code bit to each received group of five level codes. Thus the type basket as it is operated between its "Letters" and "Figures" positions provides a mechanical conversion of the received five level code information to six level code informtaion for use by the printing machine to reproduce printed copy. Considering this matter of code conversion in a little more detail, the operation is such that a received code which causes automatic actuation of the type basket to its "Figures" position results in such mechanical control of the code translator as to interpret all succeeding five level received codes as six level codes. This continues until such time as a received code causes automatic return of the type basket to its "Letters" position after which the code translator interprets received five level codes as such. This operation permits a plurality of five level codes to be used in identical form to record two different items of print-control or functional-control information each such code being preceded by one of two distinctive type basket shift codes by which positively to identify the individual one of the two items of information designated by the code. In this manner all recorded print-control and functional-control information is effectively recordable in six level code form without actually exceeding five code levels.

The printng machine includes a reader for reading print-control and functional-control information recorded in a record medium, shown by way of example herein as a punched tape record medium, and also includes a recorder for recording print-control and functional-control information in a second record medium also shown herein as of punched tape form. Information read from a record medium may be used to effect automatic operation of the printing machine by which to duplicate printed copy, and the printing machine during such operation develops print-control and functional-control coded information required to duplicate the printed information. The information recorder of the printing machine may record the developed information last mentioned, or may receive and record the information derived by the reader during those intervals when the printing machine is automatically placed in "nonprint" condition by virtue of manual control or by functional information read by the reader from the record medium. During such nonprint intervals of the printing machine all character-print and functional-control key levers are electrically locked against actuation by operation of the code translator (in a manner presently to be described) with the exception of the basket shift key lever which continues to operate so that the position of the type basket at any time is the correct one for proper code conversion as between five level and six level code information in the manner above mentioned. By so continuing the shift operations of the type basket during nonprint intervals, print-restore function information derived by the reader from the record medium (or manually controlled resumption of printing) causes resumption of reproduction of printed copy while maintaining at all times accurate translation of the five level and effective six level information derived by the reader from the record medium.

It may be mentioned in passing that a "stop" code as used in the printing machine herein described is in the form of a blank code (zero code level or zero information bits), and that selection as between two information recorders is by operation of a single key lever effected by selecting one recorder in one type basket position and the other recorder in the other type basket position.

The key lever mechanical interlock arrangement mentioned above is illustrated in Figs. 1–5. Referring more particularly to the elevational view of Fig. 1, the operating structure shown is with one or two exceptions noted below that shown and described in the above-mentioned United States Patent to E. O. Blodgett No. 2,700,446 to which reference is made for a detailed description of the overall construction and operation of the printing machine. It may briefly be mentioned for purposes of the present description that an over-center-biased form of toggle linkage structure 10 is positioned at the left hand and right hand sides of the printing machine and operates to effect positive movement of the type basket to its upper or "Letters" position and to its lower or "Figures" position. As explained in the Blodgett patent, the basket shift to its two positions is effected by linkage drive from a power roll 11 which also effects drive through individual linkage structures of functional-control and character-print key levers of the machine.

The type basket shift toggle linkage structure 10 includes a link member 12 which is pivoted at 13 to a crank arm 14 fixed to a shaft 15. The crank arm 14 includes an extended end 16, which carries a fixed pin 17 movable with basket shift from the "Letters" position shown in solid lines to the "Figures" position shown in broken lines. The pin 17 in thus moving engages the rear end portion 18 of an articulated lock lever 19 to move the latter from its "Letters" position shown in solid lines to its "Figures" position shown in broken lines. The lock lever 19 is formed of the rear end portion 18 and a front portion 20. These two portions normally move together as a unit about a pivot shaft 21, but are pivoted together at a point 22 to permit the lock lever portions to move out of normal alignment whenever the portion 20 is actuated downward towards its "Figures" position but is restrained at its forward end from actually moving for reasons presently to be considered. The forward lock lever section 20 includes a bail 23 which underlies the lower edge of the lock lever portion 18, and the lock lever 19 is normally biased to its "Letters" position by a spring 24 which extends between a fixed member 25 on the writing machine and an apertured upturned end portion 26 at the rear end of the lock lever portion 20.

Figures 3, 4, 5:
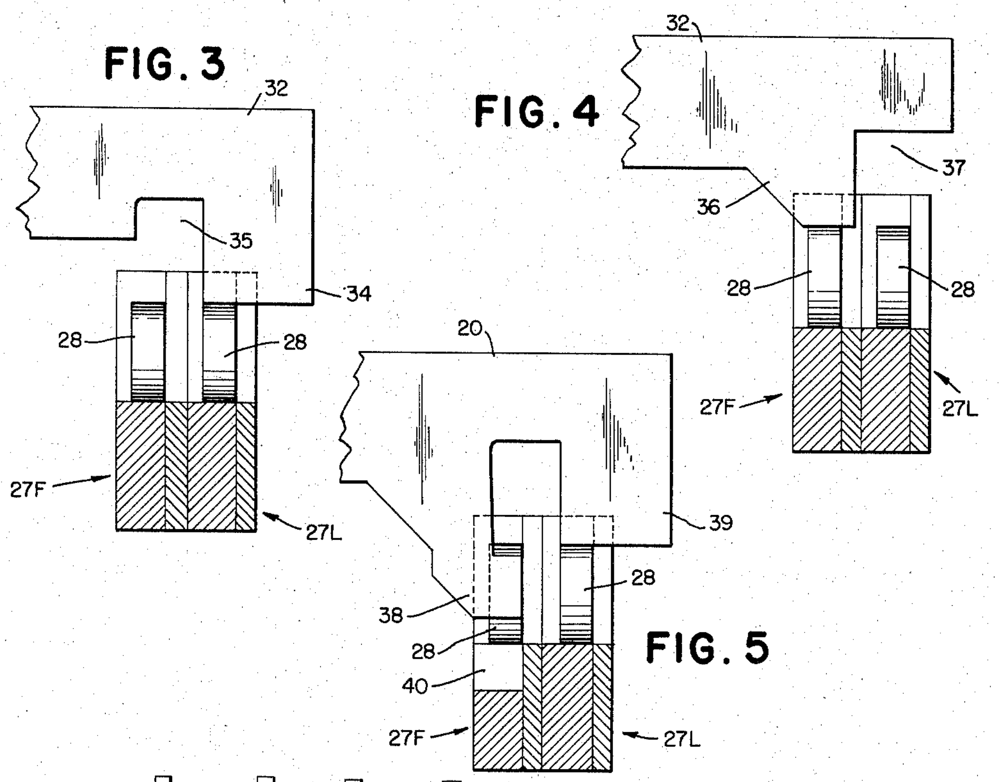
Figure 2:
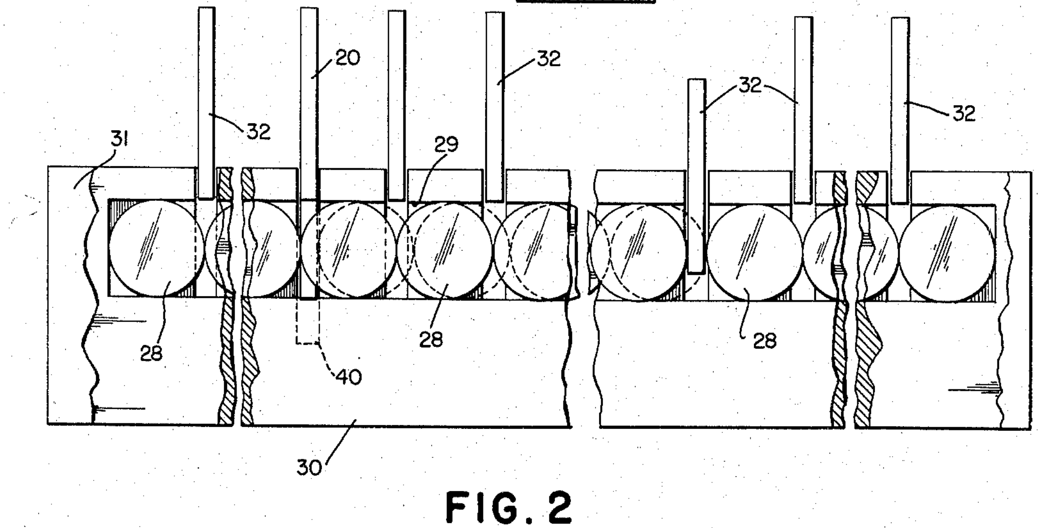

The forward end of the lock lever 19, as well as the forward end of each of the character-print and functional-control key levers of the printing machine, engages a mechanical key lever interlock structure 27 which is shown more clearly in the enlarged fragmentary views of Figs. 3–5. Fig. 2 illustrates in front elevational view the mechanical interlock structure for one of the two "Letters" and "Figures" groups of key levers mentioned above, and includes a plurality of circular discs 28 which are restrained to roll sidewise in a longitudinal milled slot 29 in a base member 30 of what might be considered a raceway having a cover member 31. The top edge of the base member 30 and cover 31 are slotted to receive the front end of the lock lever portion 20 and the front end portion of each of a plurality of key levers 32 comprising the character-print and functional-control key levers of one group thereof. The milled slot 29 has a length equal to the width of one key lever plus the sum of the diameters of all of the discs 28 so that one key lever, but only one, may be moved down between the discs 28 at any one time. The inserted key lever accordingly causes the discs on each side of it to be pushed sidewise so that the end discs on each side engage the ends of the slot 29, and a second key lever of the group therefore cannot concurrently be inserted between the discs and is mechanically locked against actuation. Fig. 2 shows one such key lever 32 inserted between the discs 28. Upon return of this key lever to its normal position above the discs, another key lever or the lock lever 20 can then be inserted between the discs and in doing so will physically displace the discs on one side of it as indicated in broken lines again mechanically to lock against actuation any other key lever in the associated group.

As illustrated in the elevational cross-sectional views of Figs. 3 and 4, two structures of the Fig. 2 type are employed. The forward interlock structure 27L cooperates with the "Letters" key lever group, and the rear interlock structure 27F cooperates with the "Figures" key lever group. The key levers of the "Letters" group and those of the "Figures" group have unlike end configurations. Thus as shown in Fig. 3, each key lever of the "Letters" group has a forwardly positioned downwardly projecting end portion 34 which projects between the discs 28 of the forward interlock structure 27L upon actuation of a key lever of this group, and includes a rearwardly positioned cut out portion 35 which avoids engagement of the key lever with the rear mechanical interlock structure 27F. Fig. 4 illustrates the configuration of the end portion of each key lever of the "Figures" key lever group, and it will be seen that each key lever of this group includes a rearwardly positioned projecting portion 36 which may be inserted between the discs 28 of the rear mechanical interlock structure 27F, and includes a forwardly positioned notch 37 to avoid engagement with the front interlock structure 27L upon actuation of the key lever.

The basket shift lock lever portion 20 has the end configuration illustrated in Fig. 5, and includes a first downwardly projecting portion 38 which cooperates with the discs 28 of the rear interlock 27F and a second downwardly projecting portion 39 which cooperates with the discs 28 of the forward interlocking structure 27L. In particular, the lock lever portion 20 is shown in Fig. 5 elevated to its "Letters" position where its projecting portion 38 is inserted between the discs 28 of the rear interlock 27F to lock the "Figures" group of key levers against actuation. In this position, the forward projection 39 of the lock lever portion 20 is elevated above the discs 28 of the forward interlock 27L thereby to permit actuation of any key lever in the "Letters" group of key levers. Upon movement of the basket shift lock lever portion 20 downward to its "Figures" position, the projection 38 moves beneath the discs 28 of the rear interlock 27F and into a slot 40 provided in the base member 30 of the latter, thus releasing the rear interlock for actuation of any "Figures" key lever, while at the same time the end portion 39 of the lock lever portion 20 moves between the discs 28 of the forward interlock 27L and thereby locks the "Letters" key levers against actuation.

It will be apparent from the foregoing description of the key lever mechanical interlock structure that each key lever of the "Figures" group when moved to actuated position mechanically interlocks against concurrent actuation any other key lever of the "Figures" group, that each key lever of the "Letters" group provides like mechanical interlock against concurrent actuation of any other "Letters" key lever, and that the position of the type basket selects at any time and through action of its lock lever 19 which group of "Figures" or "Letters" key levers may be actuated and which group is mechanically locked against actuation. Automatic control of the type basket positioning by functional-control information read from an information storage medium may cause the type basket to shift to its "Figures" position at a moment when a "Letters" key lever stands in actuated position. In this case the basket shift lock lever portion 20 would itself be mechanically interlocked against moving to its "Figures" position. The articulated structure of the basket shift lock lever 19 permits its rear end portion 18 to move to the "Figures" position while at the same time permitting its forward end portion to remain temporarily in its "Letters" position until such time as a "Letters" key lever returns to unactuated position to permit movement of the lock lever portion 20 to "Figures" position where it locks the "Letters" key levers against actuation and unlocks the "Figures" key levers for actuation.

While not shown in Fig. 1, a linkage mechanism is provided in the manner shown in the aforementioned Blodgett patent between the type basket shift drive structure and a translator slide in the code translator of the printing machine by which the type basket in its "Figures" position effectively adds a sixth code level or sixth code bit to five level code information read from a character-print and functional-control information storage medium. It thereby performs a mechanical code interpretation to resolve certain information ambiguity occasioned by use of a simplified five level code having multiple dual information codes of identical code form. Such a code form is shown in Fig. 6, and it will be apparent by way of example that a 2—4 code is used to identify both the Letter "R" and the Figure "4". In the "Figures" position of the type basket, the sixth level code translator slide operated by the type basket effectively adds a sixth code level to identify the 2—4 code in this instance as the numeral "4", whereas the "Letters" position of the type basket removes the six level code element and thereby identifies the 2—4 code as the Letter "R". It will be noted from the representative code of Fig. 6 that the code 1—2—4—5 causes shift of the type basket to the "Figures" position, whereas the code 1—2—3—4—5 effects shift of the type basket to the "Letters" position. Thus a "Figures Shift" code read from a record medium causes shift of the type basket to the "Figures" position and identifies all ensuing codes as of sixth code level until the "Letters Shift" code is read to cause shifting of the type basket to the "Letters" position and thereby identify all subsequent codes as being of five level form until a "Figures Shift" code is again read. As noted above, the type basket shift operation between its "Figures" and "Letters" positions continues through nonprint intervals to insure proper interpretation of the effective code level read at any time from the record medium. In this regard, it may be noted that the nonprint code 2—3—4 and the print-restore code 1—2—3—4 both are effectively six level codes since they are each preceded by a "Figures Shift" code 1—2—4—5 to place the type basket in its "Figures" position and thus provide proper interpretation of the nonprint and print-restore codes as contrasted to the "C" and "K" Letter codes.

It may be mentioned that the carriage return key lever and both the right-hand and left-hand "Letters" and "Figures" key levers have a key lever forward end configuration, not shown, so cut out that these key levers do not engage either the forward or rear mechanical interlock structures. These key levers may thus be actuated during actuation of both groups of "Letters" and "Figures" key levers. This is true also of the space key lever which functions in conventional manner to word space the printing machine carriage.

*Keyboard arrangement*

Figure 7:
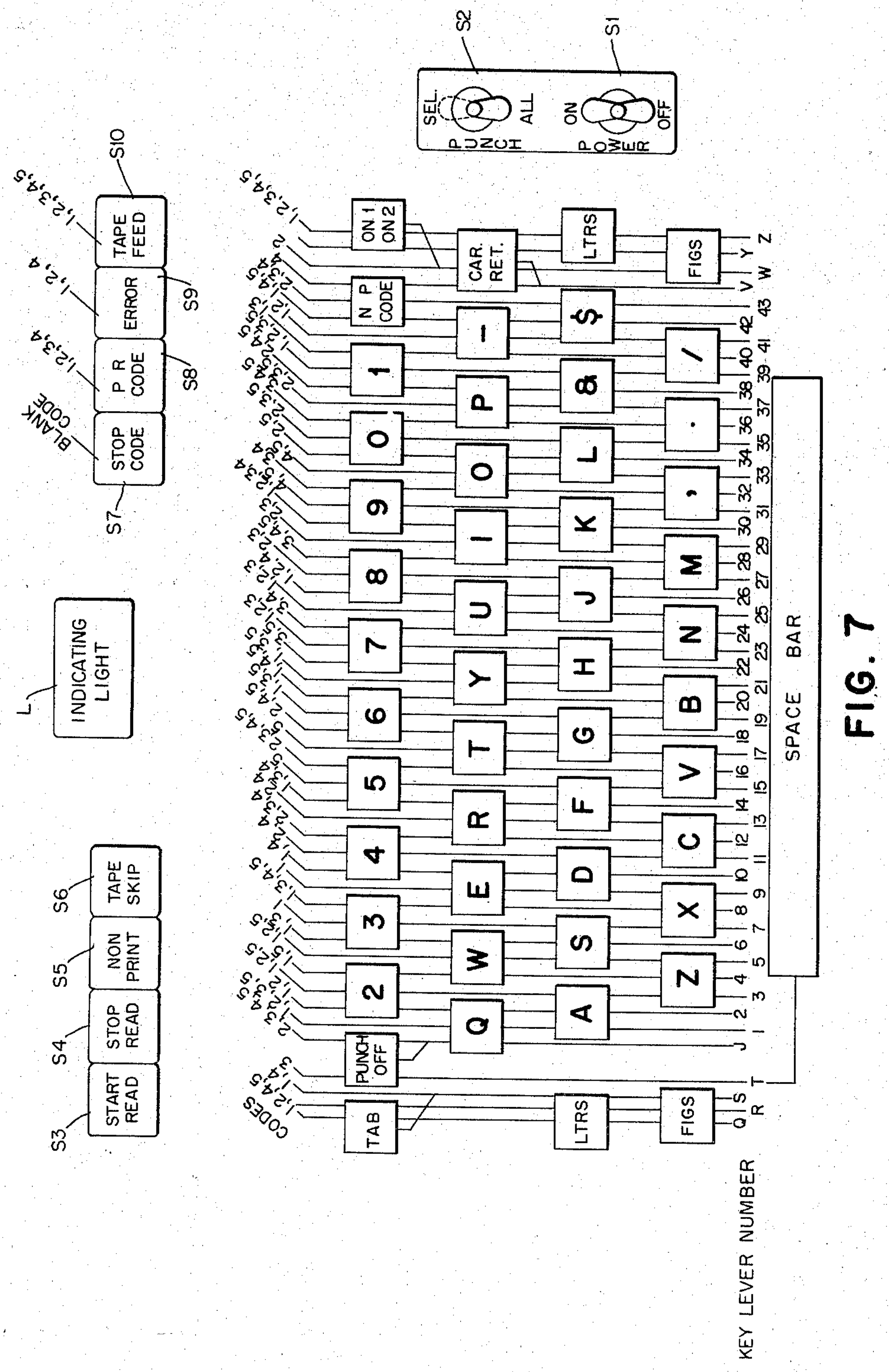
Fig. 7 illustrates a representative keyboard arrangement of the present printing machine.

A representative keyboard arrangement of the printing machine is shown in Fig. 7 wherein the functional-control and character-print key levers are each identified by a numeral or a letter of the alphabet positioned at the bottom of the key lever. A representative code individual to each key lever is shown at the top of the latter, and the duplication of identical codes referred to in connection with Fig. 6 is evident. In addition to key lever control of the printing machine, there is provided to the right of the keyboard a power switch S1 and a punch control switch S2. Above the keyboard are certain manually operated switches identified as a "start read" switch S3, a "stop read" switch S4, a "nonprint" switch S5, and a "tape skip" switch S6. Also positioned above the keyboard are four additional manually operated switches, which effect tape punch coding in accordance with an individual code shown in association with each switch, identified as a "stop" code switch S7, a "print restore" code switch S8, an "error" code switch S9, and a "tape feed" (which might also be called "code delete") switch S10. An indicating light "L," centrally positioned above the keyboard, when illuminated furnishes an indication that the punch unit forming a component of the printing machine is energized in readiness to punch a byproduct tape.

Three key levers meriting special mention are the "nonprint code," "on 1/on 2" and "punch off" key levers. The "nonprint" and "punch off" key levers are mechanically unlocked for actuation when the type basket is in its "Figures" position, and operate the code selector to effect punching of their individual codes into a byproduct tape but do not perform any printing or other functional control operation of the printing machine. This is true also of the "on 1/on 2" key lever which may be actuated when the type basket is positioned either in its "Letters" or "Figures" positions.

*Electrical control system*

Figure 8A:
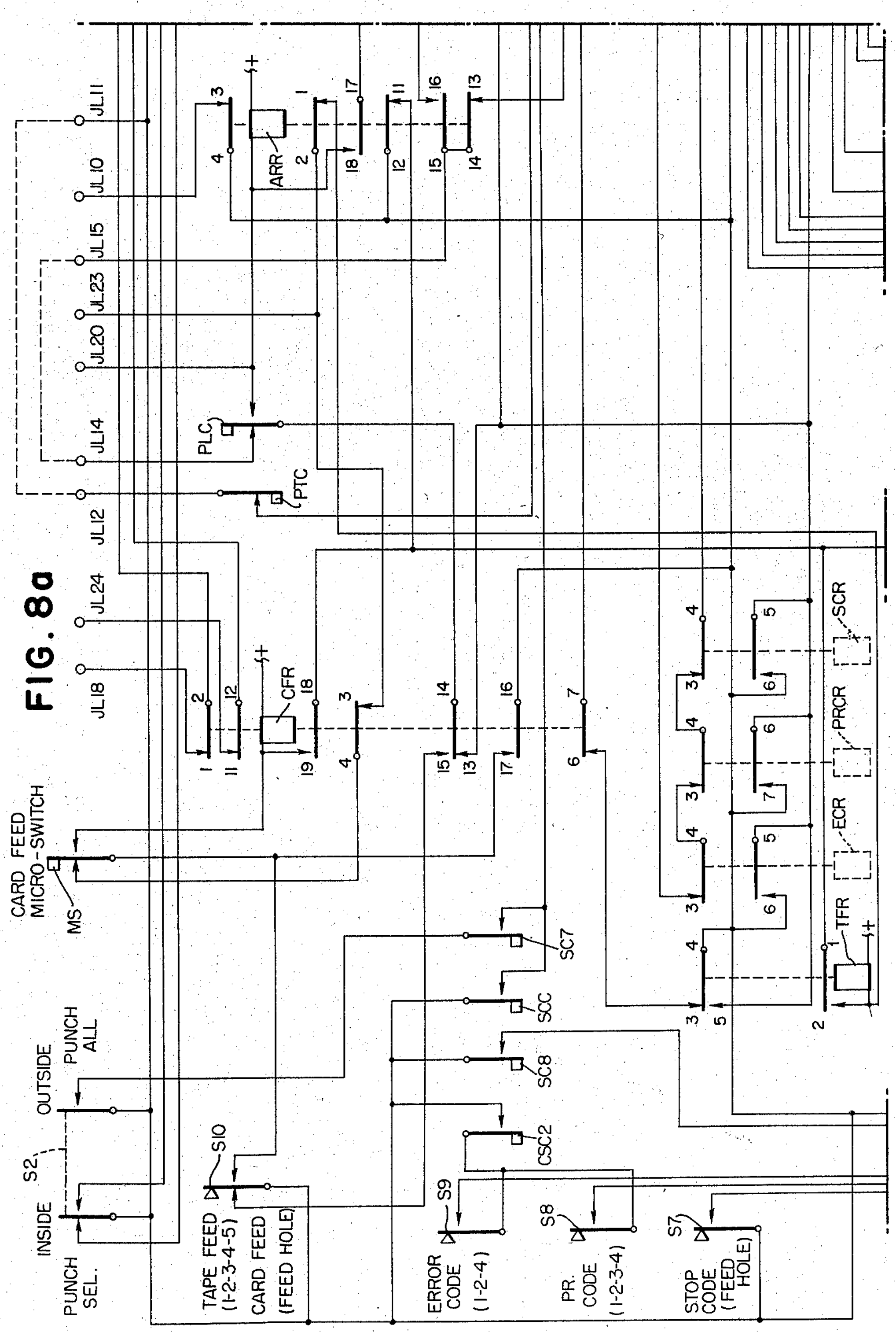
Figs. 8*a*–8*g* represent an electrical control system used in the printing machine of the invention, which figures should be considered together as a unitary structure in the manner shown in Fig. 8.
Figure 8B:
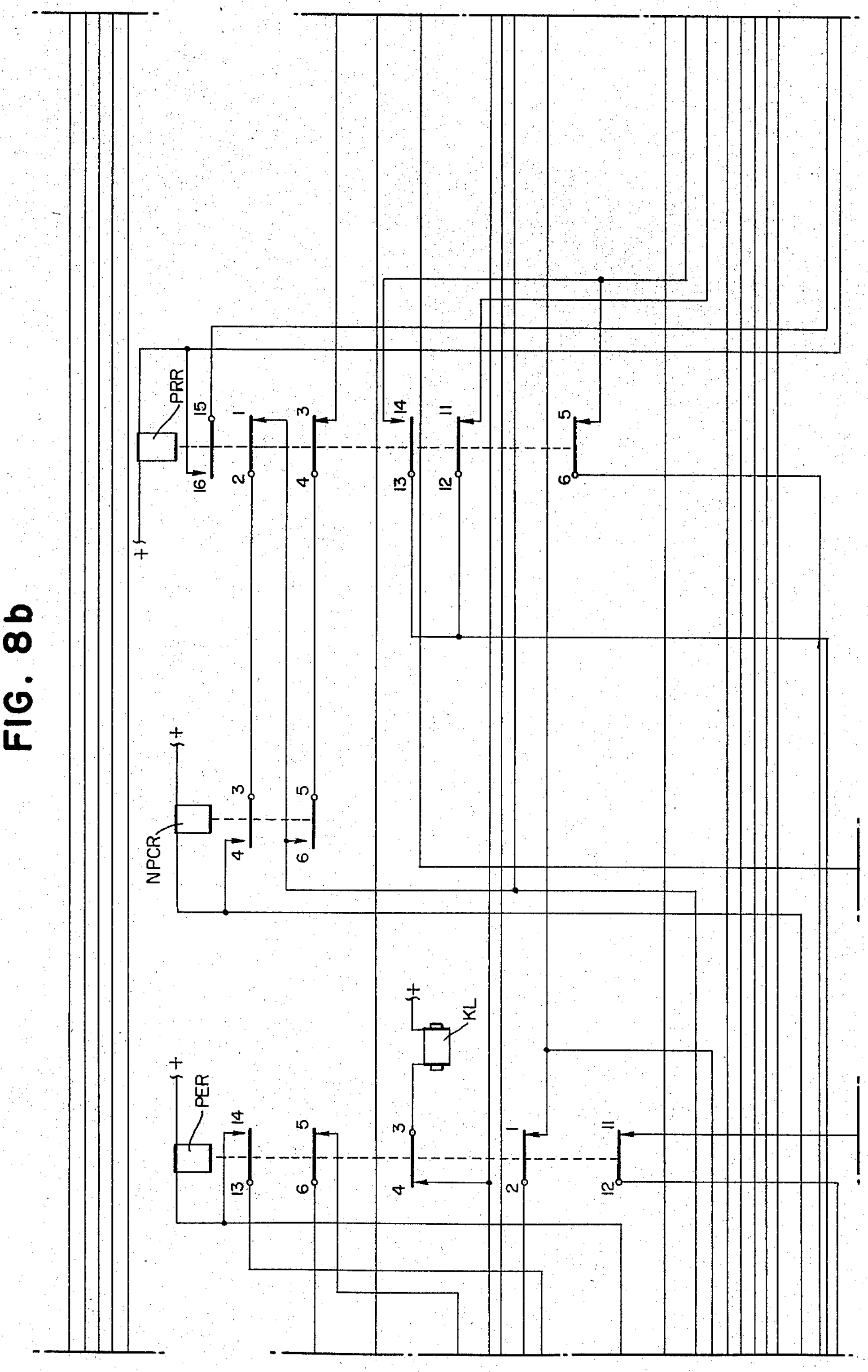
Figure 8C:
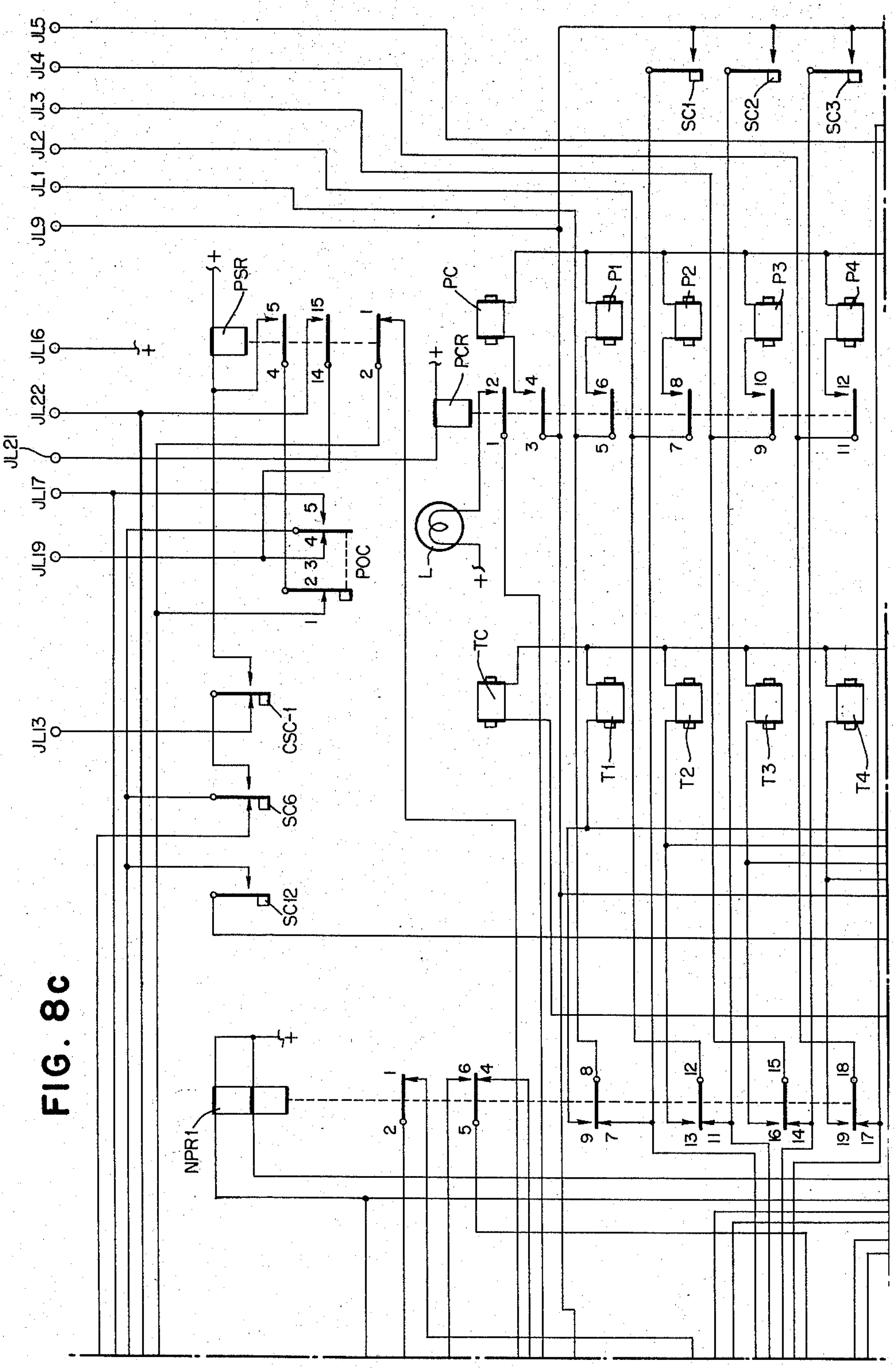
Figure 8D:
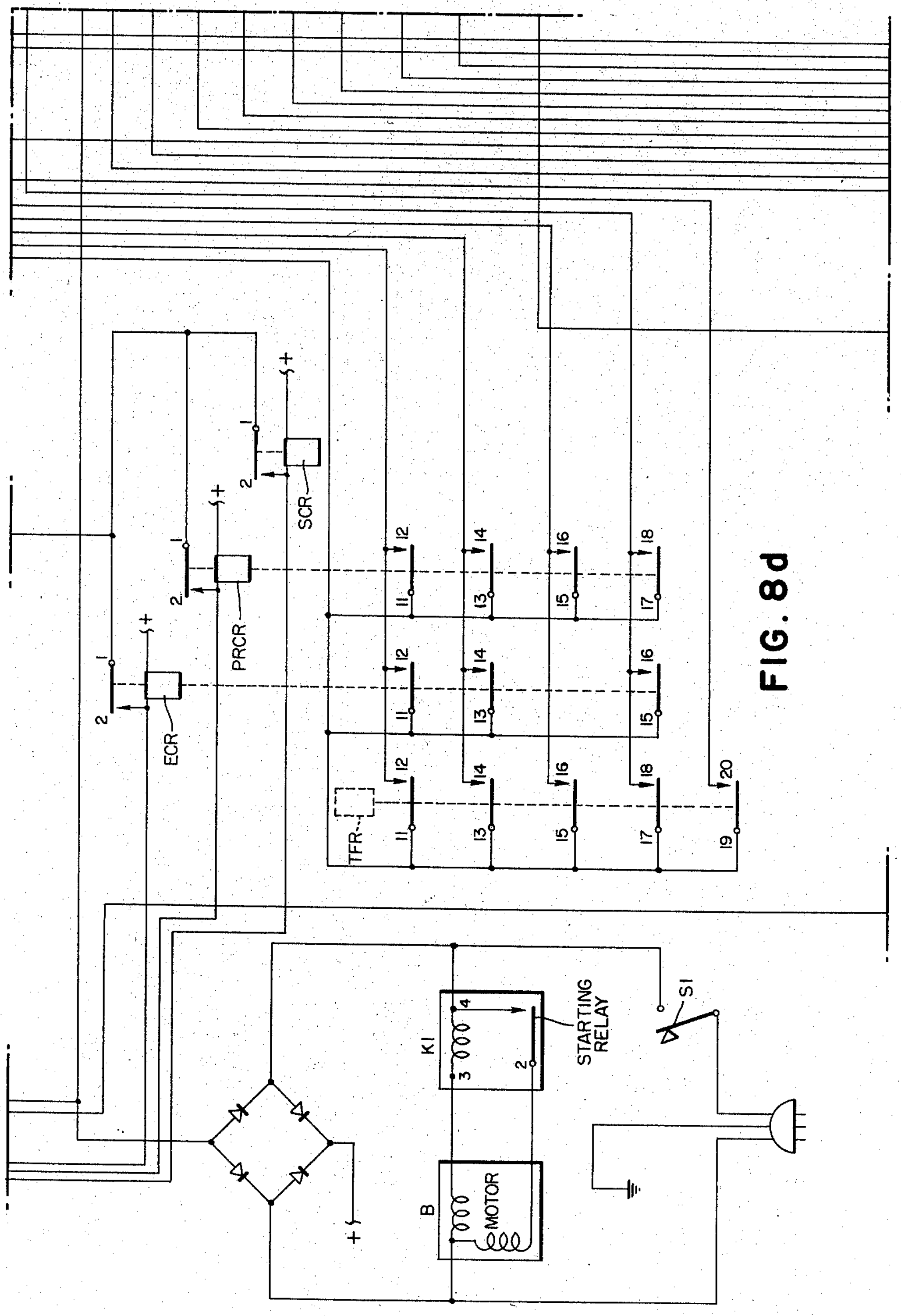
Figure 8E:
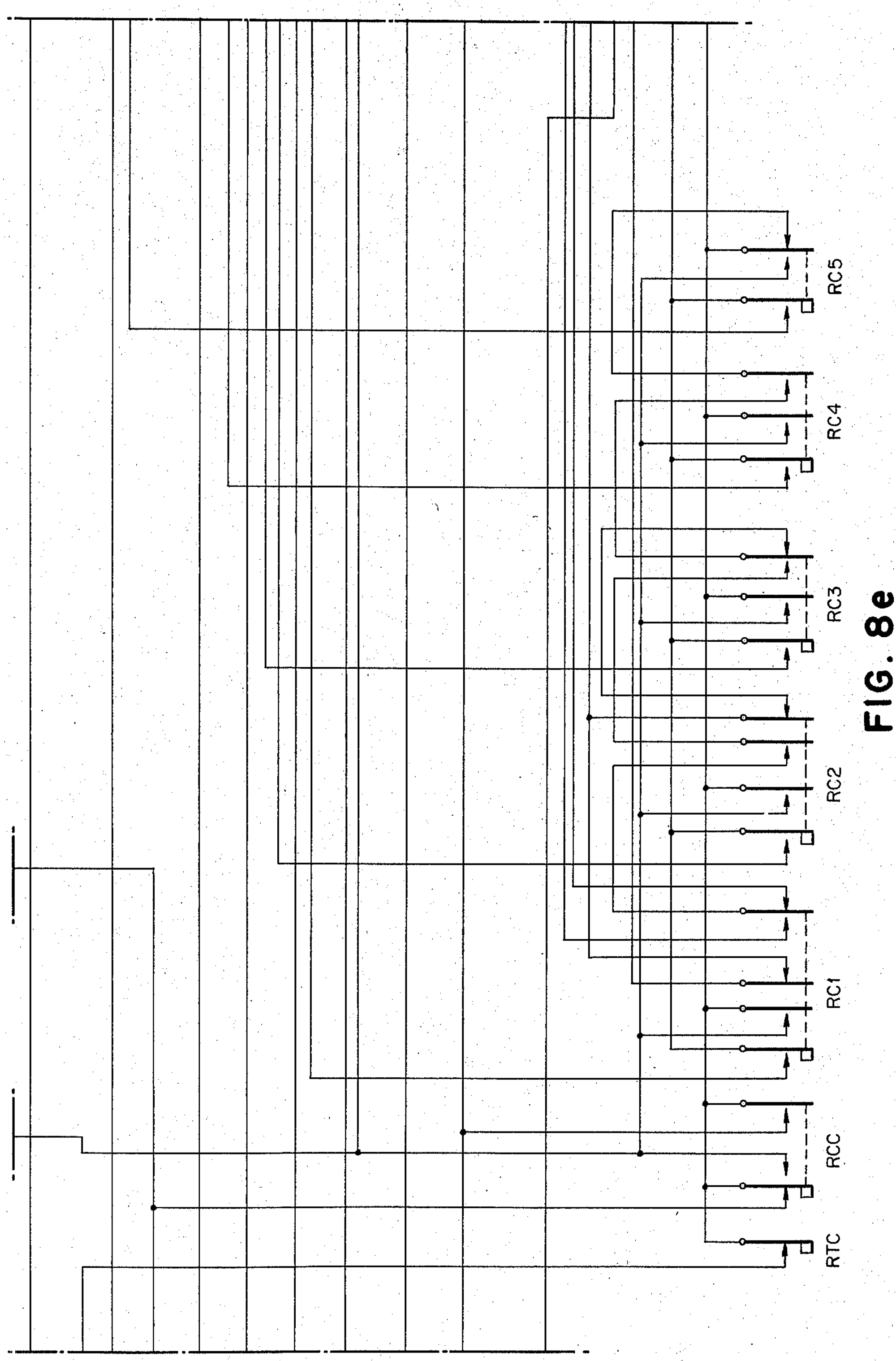
Figures 8, 8F:
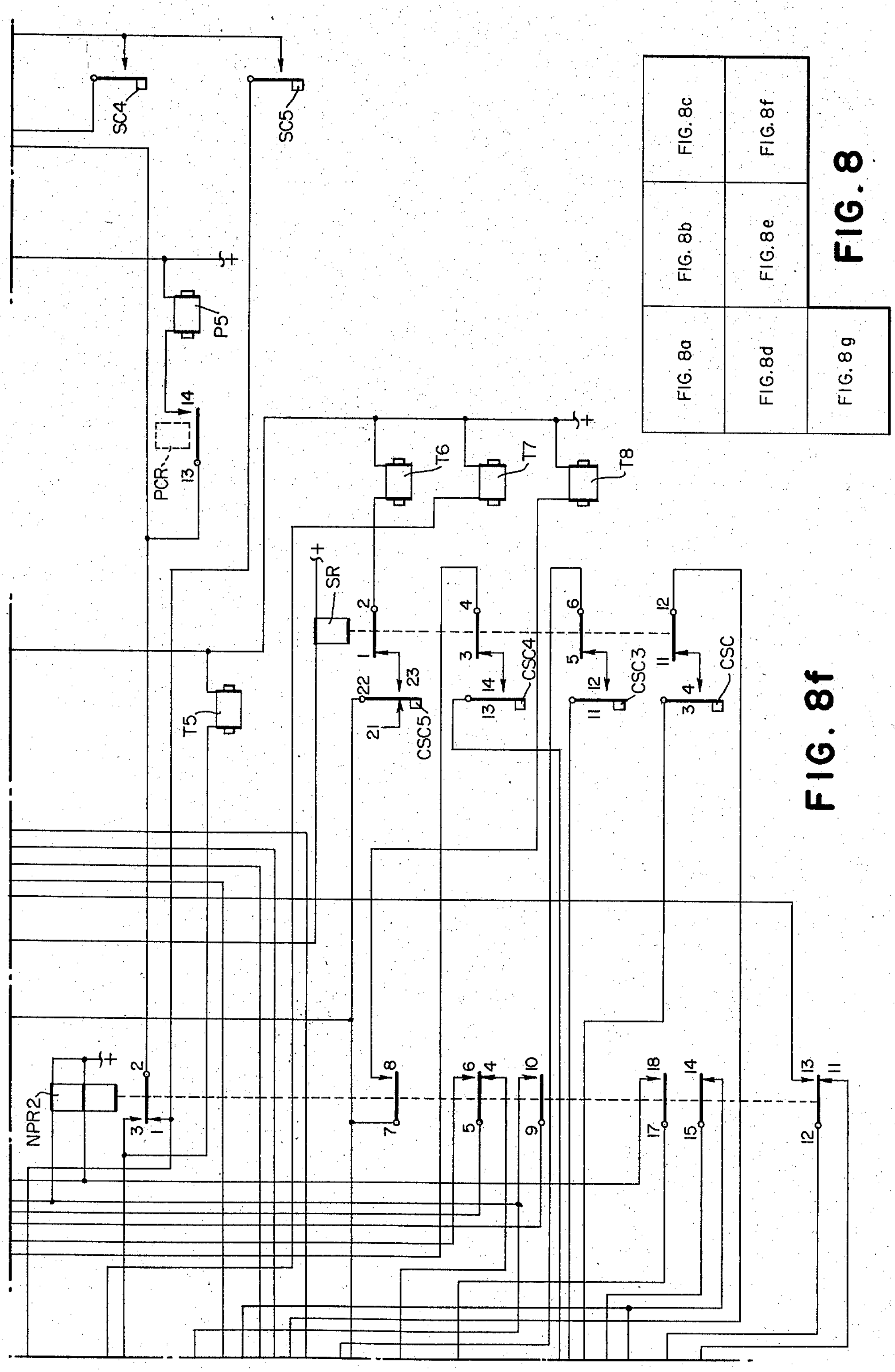
Figure 8G:
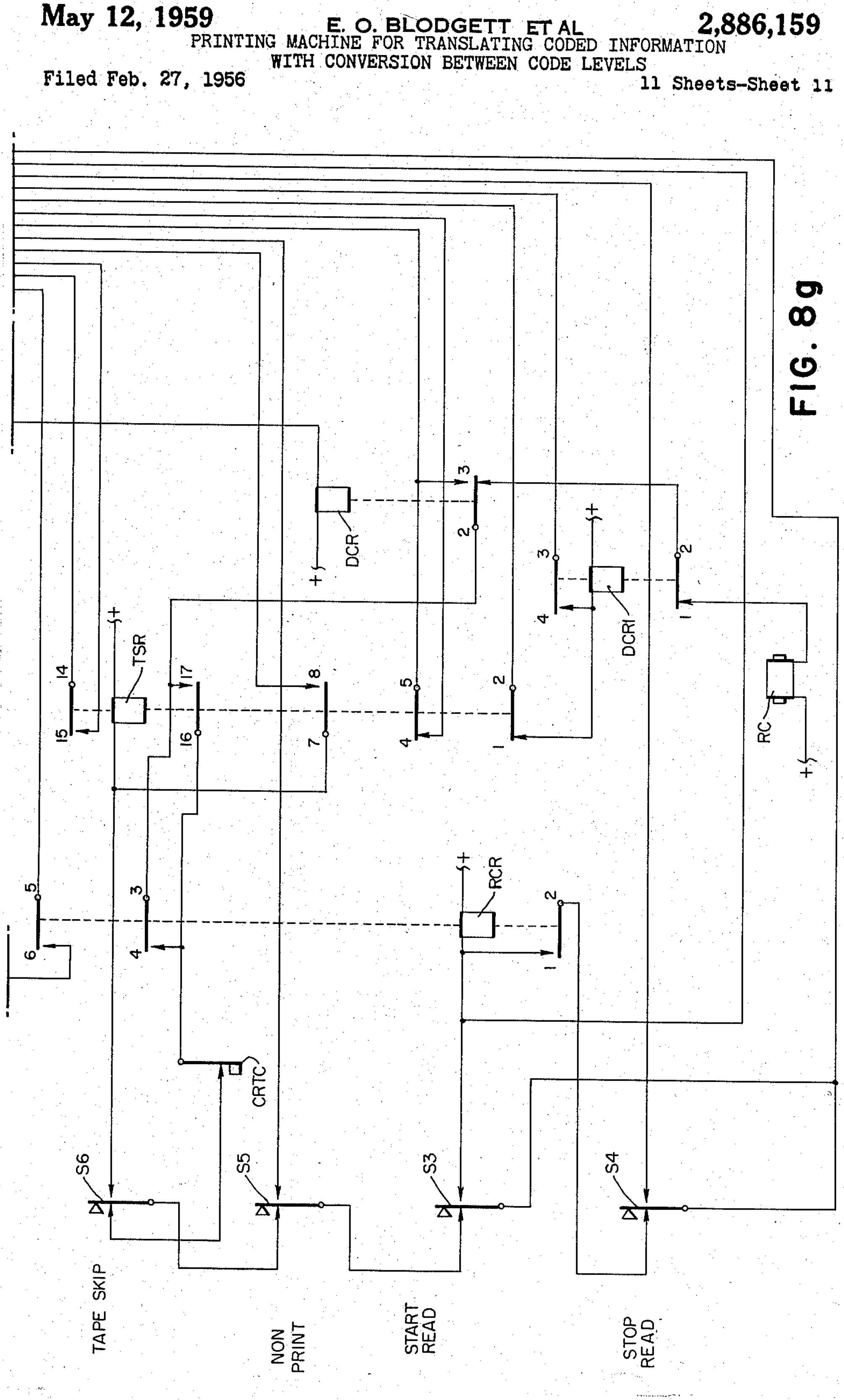

The electrical control system for the printing machine is shown in Figs. 8*a*–8*g* which should be considered together as shown in Fig. 8. This control system is quite similar to that shown and described in the aforementioned application Serial No. 535,497, and provision is here made (as in the latter arrangement) for selective punching if desired of a second byproduct tape by a second remotely situated tape punch unit.

Reference is made to the copending application last mentioned for a detailed description of those features of the control system which are herein only generally described, and only those features of the present control system which differ from that disclosed in the copending application will be considered in detail. As in the electrical control circuit shown in the copending application, the electrical control system of the present application includes certain receptacles JL1–JL5 and JL10–JL24 which provide electrical circuit connections to a remote tape punch unit when used. When the printing machine is operated without such remote punch unit, certain electrical interconnections are provided between the receptacles as indicated in broken lines (i.e. that interconnecting the receptacles JL14 and JL15, JL11 and JL12, and JL21 and JL22).

To facilitate a more complete understanding of the electrical control system herein shown, those features which are also common to the aforementioned application Serial No. 535,497, and are described in detail in the latter, will only briefly be touched upon and this brief description of the common features will be followed by a more detailed description of those features of the present control system which differ in arrangement or function as compared to the control system of the copending application.

*Tape and card feed*

After initial loading of tape or card record media into a recording punch, and also after completing the recording when either tape or card record media are used, it is desirable to feed (without further information punching) a length of the record media through the punch unit to facilitate handling and subsequent use of the punched record. This is accomplished by the tape feed switch S10, which in the case of card media, controls a card feed relay CFR in turn automatically to control the punch clutch magnet PC of the punch unit through a number of representative cycles until the end of the card is reached. This feed control is such that a blank code (only feed holes are punched) is used, and feed is automatically terminated when a card feed micro-switch MS is actuated by an aperture provided in the card stock to identify the end of each individual card record. Tape record media is punched with a 1—2—3—4—5 ("delete") code during each tape feed operation. The tape feed coding last mentioned is accomplished by energization of a tape feed relay TFR directly under control of the tape feed switch S10, but under subsidiary control of an anti-repeat relay ARR (which in turn is controlled by a punch latch contact PLC actuated during each punch cycle) and a punch error relay PER. A tape or card feed operation will be performed only when a punch unit is rendered operative by suitable energization of a punch control relay PCR, effected under control of a punch select relay PSR by suitable manual actuation of the punch control switch S2, and in the case of tape record media involves the operation of a punch tape contact PTC having closed contacts whenever tape is properly positioned in the punch unit in readiness for punching.

*Keyboard actuated character and functional control code punching*

Key lever actuation of the printing machine operates a code selector to effect closure of a plurality of contacts SC1—SC5 in the various code combinations indicated in the representative code of Fig. 6 and shown in association with the individual key levers of the keyboard chart of Fig. 7. These code selector contacts directly energize through contacts of two nonprint relays NPR–1 and NPR–2, individual ones of the punch magnets P1–P5 to effect code punching in the record media employed at the punch unit. The punch clutch magnet PC is concurrently energized in a manner described hereinafter.

A code selector contact SC6 operated by the "on 1/on 2" key lever initiates automatic punch selection (one local punch forms a component of the printing machine and the other may be constituted by a "remote" punch unit separate and distinct therefrom), whenever the punch control switch S2 is in its "punch select" position. A type basket shift contact CSC–1 is actuated to either of two contact positions by corresponding movement of the type basket to its "Letters" and "Figures" positions, and this contact accomplishes the actual automatic punch selection through energization of the punch select relay PSR (and energization of the corresponding relay of the remote punch unit). Both punch units upon being so selected are turned off under control of a punch off contact POC actuated by the "punch off" key lever. Insofar as the local punch is concerned, override of the automatic punch selection as last described may be accomplished by manual movement of the punch select switch S2 to its "punch all" position where the local punch not only records all character-print and functional-control information required to duplicate the copy printed by the printing machine but also records all punch selection control codes.

Manual actuation of the error code switch S9 to error code the record medium effects energization of an error code relay ECR through a type basket shift contact CSC–2 which permits error coding only when the type basket is in its "Figures" position. The contacts 5—6 and 11—16 of this relay directly energize the punch magnets P1—P4 and punch clutch magnet PC. Manual actuation of the print-restore code switch S8 likewise energizes, through the type basket shift contact CSC–2, a print-restore code relay PRCR which directly controls the punch magnets and punch clutch magnet to record a print-restore code 1—2—3—4. Manual actuation of the stop code switch S7 energizes a stop code relay SCR without regard to the position of the type basket. A "stop code" in the present control system is a "blank" code wherein a feed hole only is punched in the record medium, and to this end the contacts 5 and 6 of the stop code relay energize only the punch clutch magnet PC through contacts 13 and 14 of the card feed relay CFR, the punch latch contact PLC, contacts 13 and 14 of the anti-repeat relay ARR, and contacts 1 and 2 of the punch error relay PER. Since the anti-repeat relay ARR when energized by the punch latch contact PLC during a punch cycle remains energized through its hold contacts 17, 18 and the contacts 5 and 6 of the stop code relay SCR as long as the latter is maintained energized by continued manual actuation of the stop code switch S7, one feed hole is punched in the record media each time the stop code switch S7 is manually closed. Once any of the foregoing relays are energized by even momentary operation of their associated switch, the relay is maintained energized through a punch cycle by a hold circuit which includes its contacts 1 and 2 and the contacts 11 and 12 of the anti-repeat relay ARR. In recording functional-control and character-print coded information other than that above described, the punch clutch magnet PC is energized to initiate each punch cycle through the code selector common contact SCC which closes upon actuation of any key lever except the "punch off" key lever and the "on 1/on 2" key lever. The latter key levers upon actuation cause closure of a code selector contact SC7, so that the punch clutch magnet PC is energized by the latter only when the punch selector switch S2 is in its "punch all" position causing punching of all punch selection codes into the record medium of the local punch unit; otherwise, the punch clutch magnet PC is not energized and no punch select codes are recorded.

*Key lever lock-up*

Whenever the printing machine is energized for operation, the key levers of the machine are unlocked by energization of a key lock magnet KL effected through the punch error relay PER and either punch tape contact PTC or the normally closed contacts of the punch select relay PSR and contacts of the punch selector switch S2 in its punch select position. The key levers are accordingly locked up against actuation whenever (1) any condition is present which would result in erroneous punch operation or (2) whenever the punch error relay PER becomes energized by energization of the anti-repeat relay ARR caused by actuation of two key levers at a sufficiently high rate of speed as to prevent the selector common contact SCC from actually opening between the two key lever actuations.

*Tape reading operation*

The printing machine includes as an integral component thereof a tape or card reader unit which has a plurality of reader contacts RCC and RC1–RC5. As more fully explained in the aforementioned patent and copending application, upon energization of the reader clutch magnet RC the reader common contact RCC is actuated and the reader contacts RC1–RC5 are individually caused to be actuated or to remain unactuated depending upon the particular information code read during a particular reader operating cycle. The reader unit is placed in operation by manual actuation of the start read switch S3 which energizes the reader control relay RCR, and the latter remains so energized through a hold circuit which includes the stop read switch S4 and the reader common contact RCC in unactuated position or any actuated ones of the reader contacts RC1–RC5. The reader control relay RCR establishes an energizing circuit for the reader clutch magnet RC through contacts of a delay control relay DCR, a second delay control relay DCR–1, a carriage return and tabulating contact CRTC, the tape skip switch S6, the nonprint switch S5, and start read switch S3. The energizing circuit last mentioned further extends through the reader common contact RCC in unactuated position or any of the reader contacts RC1–RC5 in actuated position, so that both the reader clutch magnet RC and the reader control relay RCR remain energized to continue the reader operation until a blank stop code is read at which time the reader common contact RCC opens but none of the reader contacts RC1–RC5 close.

The reader contact energizing circuit for the reader clutch magnet RC, as just described, is bypassed by contacts 16 and 17 of the tape skip relay TSR when the latter is energized by manual operation of the tape skip switch S6. Upon becoming energized, the tape skip relay TSR remains energized through its hold contacts 7 and 8 and the contacts 5 and 6 of the print-restore relay PRR so that the tape skip operation is terminated only by reading a print-restore code 1—2—3—4 at the tape reader to energize the print-restore relay PRR and thereby interrupt the hold circuit of the tape skip relay TSR. This operation is manually selected during programmed printing operations each time that it is desired to skip a preselected section of tape, which may correspond to a part of a line or one or more complete lines of print-control information read from the tape. Upon energization of the tape skip relay TSR, the bypass circuit provided by the contacts 16 and 17 of the latter causes all stop codes read by the reader to be ignored during each line skip operation of the machine; that is, the first read stop code opens the hold circuit for the reader control relay RCR which drops out and opens its contacts 3 and 4, but these are bypassed by the contacts 16 and 17 of the tape skip relay TSR so that the reader clutch magnet RC is energized by at least the reader common contact RCC (which closes at the end of every reader cycle) to initiate a new reader cycle and this is true even though a number of stop codes occur in succession. Carriage return codes read during a tape skip operation effect carriage return and accompanying line space, but any other code in the tape is ineffective to cause operation of the printing machine.

The reader common contact is effective to energize the translator clutch magnet TC of a code translator unit forming a component of the printing machine, and the reader contacts RC1–RC5 control individual ones of the translator magnets T1–T5. The translator unit operates to translate or interpret each information code read from the punched tape and to effect actuation of the character-print and functional-control key levers of the printing machine to reproduce printed copy. During such automatic operation of the printing machine, key lever actuations cause operation of the code selector contacts in the manner above described to effect energizations of the punch clutch magnet and code combinations of the punch magnets through nonprint relays NPR–1 and NPR–2.

Should it be desired to place the printing machine in nonprint condition, the nonprint switch S5 is manually actuated to effect energization of the nonprint relays NPR–1 and NPR–2 which thereupon transfer control of the punch clutch magnet PC and punch magnets P1–P5 directly to the reader contacts RCC and RC1–RC5. At the same time, the contacts 7 and 8 of the nonprint relay NPR–2 energize a translator magnet T8 which actuates a slide of the code translator. This slide in actuated position effectively mechanically inserts what might conveniently be considered an eighth level or "manual nonprint" code bit having the effect of rendering the code translator unit ineffective to cause automatic operation of the printing machine (aside from the basket shift functions) so long as the translator magnet T8 remains energized. The nonprint relays NPR–1 and NPR–2 continue to remain energized (thereby continuing the nonprint operation) through the contacts 9 and 10 of the nonprint relay NPR–2, normally closed contacts 11 and 12 of a print-restore relay PRR, and the now closed contacts 1 and 2 of the reader control relay RCR which it was mentioned above remains energized until the next stop code is read from the tape. Reading such stop code thereupon deenergizes the reader control relay RCR to terminate further reader operation and also to deenergize the nonprint relays NPR–1 and NPR–2. This conditions the system for normal automatic print operation when resumed by manual actuation of the start read switch S3 once more to energize the reader control relay RCR.

The nonprint operation last described may also be automatically started and stopped by reading nonprint and print-restore codes in the program tape at the reader. Whereas a manual nonprint operation is terminated by reading a stop code as just explained, an automatic nonprint operation is terminated only by reading a print-restore code, which incidentally does not interrupt the continued operation of the reader. Such automatic nonprint operation is initiated by reading a nonprint code 2—3—4 in the "Figures" position of the type basket, which thereupon causes the reader contacts RC2—RC4 to actuate the nonprint key lever. This in turn actuates a selector code contact SC8 which energizes a nonprint control relay NPCR through the contacts 5 and 6 of the reader control relay RCR. Energization of this relay causes the nonprint relays NPR–1 and NPR–2 to become energized through normally closed contacts of the print-restore relay PRR, the nonprint control relay NPCR remaining energized to continue the nonprint operation through its own now closed contacts 3 and 4 and the normally closed contacts 1 and 2 of the print-restore relay PRR.

It is the purpose of the delay control relay DCR1 to halt the reader operation for a short interval sufficient to permit the nonprint relays NPR–1 and NPR–2 to pick up in the manner last mentioned. To this end, the delay control relay DCR1 is energized upon reading a nonprint code 2—3—4 at a time when the type basket is in its "Figures" position, this energizing circuit being traced from the relay DCR1 through the normally closed contacts 1 and 2 of the tape skip relay TSR, the normally closed contacts 5 and 6 of a selector relay SR, the type basket shift contacts CSC–3 (having its contacts closed by the "Figures" position of the type basket), normally closed contacts of the reader contact RC1, and a series circuit which includes normally open contacts of the reader contacts RC2—RC4 and a normally closed contact of the reader contact RC5. The hold circuit for the delay control relay DCR1 extends through its own contacts 3 and 4 and the contacts 4 and 5 of the nonprint relay NPR–2 so that the delay control relay DCR1 becomes deenergized when the nonprint relay NPR–2 picks up. During the interval of energization of the delay control relay DCR1, its contacts 1 and 2 interrupt the energizing circuit of the reader clutch magnet RC to halt the reader operation.

Normal printing operations are automatically restored upon reading a print-restore code 1—2—3—4 at a time when the type basket is in its "Figures" position. This is accomplished by energizing a print-restore relay PRR through the normally closed contacts 3 and 4 of the selector relay SR, type basket shift contacts CSC–4 (closed with the type basket in its "Figures" position), and a series circuit which includes normally open contacts of the reader contacts RC1–RC4 and a normally closed contact of the reader contact RC5. Upon energizing the print-restore relay PRR, the hold circuit for the nonprint control relay NPCR is interrupted at the contacts 1 and 2 of the print-restore relay PRR so that the relay NPCR becomes deenergized. At the same time, the contacts 3 and 4 of the print-restore relay PRR open to deenergize the nonprint relays NPR–1 and NPR–2 which, however, may continue to remain energized to the end of the reader cycle through the contacts 17 and 18 of the nonprint relay NPR–2 and normally open contacts of the reader common contact RCC. It may be noted that the delay control relay DCR1 is not energized for this operation since its energizing circuit, while otherwise completed by the reader contacts RC2—RC4, is interrupted by actuation of the reader contact RC1 in reading the print-restore code. The print-restore relay PRR remains energized through its contacts 15 and 16 until the contacts 5 and 6 of the nonprint relay NPR–2 open at the time this relay drops out. During the interval that the print-restore relay PRR is energized, its contacts 13 and 14 establish a hold circuit for the reader control relay RCR so that the latter remains energized through that reader cycle to complete the print-restore operation even though an attempt is made during this interval to terminate all further reader operation by manual actuation of the stop read switch S4.

It is the function of the delay control relay DCR temporarily to halt the reader operation upon reading a carriage return code 4 or a tabulate code 1–4 (type basket in "Figures" position), the relay being energized for this purpose through normally closed contacts of the nonprint relay NPR–2 and a series circuit which includes normally closed contacts of the reader contact RC4. The delay control relay contacts 1 and 2 interrupt the energization of the reader clutch magnet RC, and the relay remains energized by closure of its contacts 2 and 3 and the now closed contacts 3 and 4 of the reader control relay RCR until such time as the carriage initiates its return movement and opens the carriage return tabulating contact CRTC. The latter contact again closes when the carriage completes its return and the reader clutch magnet RC is once more energized as before.

It was earlier stated that a tape skip operation is effected by manually actuating a switch S6 to energize the tape skip relay TSR and thereby effect skipping of a preselected part of a line or one or more complete lines of information read by the reader from the punched tape. Energization of the relay TSR energizes a translator magnet T7 through the contacts 14 and 15 of the tape skip relay and normally open contacts of the reader common contact RCC. Thus the translator magnet T7 is energized by the latter contacts once each reader cycle, and as thus energized prevents automatic selection and operation by the translator of all key levers except the carriage return key lever. This energization of the translator magnet T7 effectively provides a form of "nonprint" operation and continues during the tape skip interval by virtue of the fact that the tape skip relay TSR completes a hold circuit which extends through its own contacts 7 and 8 and the normally closed contacts 5 and 6 of the print restore relay PRR as earlier mentioned. It may be noted that the contacts 4 and 5 of the skip relay TSR open during the tape skip operation to prevent energization of the delay control relay DCR when a tab control function is read by the reader, thus avoiding an unnecessary delay which is not needed since the printing machine is not printing at this time.

An important feature of the present control system resides in the proper interpretation or code translation of plural information codes each having identical code form but actually recording two different items of information individually distinguishable by the position of the type basket in its "Letters" or "Figures" position. It has been explained above that the type basket upon shifting to the "Figures" position causes actuation of what might be considered a sixth code level translator slide by which to identify by type basket position whether a specific code read by the tape reader is actually conveying five level code information or effectively conveying six level code information. It will further be recalled that the shift of the type basket between its "Letters" and "Figures" positions is under specific control of "Letters" and "Figures" functional-control information read from the tape by the reader, so that all recorded information of the tape is preceded by a type basket shift code which thereby identifies the succeeding coded information as being of five level or six level form. The type basket positional control of the sixth level translator slide is accomplished by a type basket shift contact CSC–5, the contacts of which are closed by movement of the type basket to its "Figures" position. The type basket shift contact CSC–5 energizes a translator magnet T6 which actuates the sixth level slide of the translator so that the latter effectively converts the five level code read at this time to a six level code identifying all numeral and punctuation print-control information and certain functional-control information as indicated in Fig. 6. Thus the translator at this time causes actuation of these print-control and functional-control key levers but does not actuate any "Letters" key lever. This is consistent with the key lever mechanical interlock structure operation wherein the "Letters" group of key levers is locked against actuation when the type basket is in its "Figures" position.

Assuming that the type basket is in its "Figures" position and is automatically operated to its "Letters" position by actuation of the "Letters" shift key lever, the latter operates through the code selector to close the contacts of a code selector contact SC12. The contact SC12 thereupon energizes the shift relay SR having contacts in the energizing circuit of the translator magnet T6, the energizing circuit of the print-restore relay PRR, the energizing circuit of the delay control relay DCR1, and the energizing circuit of the delay control relay DCR. The shift relay SR is a fast operating relay which when energized provides an immediate and rapid interruption of the energizing circuits of the components named.

The mechanically performed interpretation of the multiple dual information codes of identical code form, accomplished as above explained by effective conversion of specific five level information read from a punched tape by the reader to six level information upon shift of the type basket to the "Figures" position, substantially expands the information handling capacity of a five level code. Except for the mechanical code interpretation thus effected by a printing machine embodying the present invention, the matter of expanding the information capabilities of a five level code is similar to that disclosed and claimed in the copending application Serial No. 546,902, filed November 15, 1955, in the name of Edwin O. Blodgett, entitled Code Form Converter, and assigned to the same assignee as the present application. In doing so, all character-print and functional-control operations are performed by a printing machine embodying the present invention in the alternative in two groups of such information but with reliable and consistent mechanical interlock against erroneous occurrence of simultaneous operations in both information groups. A printing machine embodying the invention accordingly is enabled to operate with full program control functions effectively involving a six level code but actually utilizing only a five level code for all recording purposes.

While a specific form of the invention has been described for purposes of illustration, it is contemplated that numerous changes may be made without departing from the spirit of the invention.

What is claimed is:

1. A printing machine for translating functional-control and character-print information comprising, reading means for developing control effects representative of functional-control and character-print information recorded in a record medium, printing means operable in the alternative by manual actuation and in response to said developed control effects for printing information, said printing means including functional-actuated print-control means selectably operable to each of two positions during information translation operations, and means responsive to the positioning of said print-control means in at least one of said two positions thereof for selectably modifying the response of said printing means to said manual actuation and said developed control effects.

2. A printing machine for translating functional-control and character-print information comprising, reading means for developing control effects representative of functional-control and character-print information recorded in a record medium, printing means operable in the alternative by manual actuation and in response to said developed control effects for printing information, said printing means including functional-actuated print-control means selectably operable to each of two positions for effecting selectable translation of characters in either of two preselected character groups, and means responsive to the positioning of said print-control means in at least one of said two positions thereof for selectably modifying the response of said printing means to said manual actuation and said developed control effects.

3. A printing machine for translating functional-control and character-print information comprising, reading means for developing control effects representative of functional-control and character-print information recorded in a record medium, printing means operable in the alternative by manual actuation and in response to said developed control effects for printing information, said printing means including a functional-actuated type basket selectably positionable in each of two positions for effecting selectable translation of characters in either of two preselectable character groups, and means responsive to the positioning of said type basket in at least one of said two positions thereof for selectably modifying the response of said printing means to said manual actuation and said developed control effects.

4. A printing machine for translating functional-control and character-print information comprising, reading means for developing control effects representative of functional-control and character-print information recorded in a record medium, printing means operable in the alternative by manual actuation and in response to said developed control effects for printing information, said printing means including functional-actuated print-control means selectably positionable in each of two positions during information translation operations, and means responsive to the positioning of said print-control means in said two positions thereof for establishing corresponding different responses of said printing means to both said manual actuation and said developed control effects.

5. A printing machine for translating functional-control and character-print information comprising, reading means for developing control effects representative of functional-control and character-print information recorded in a record medium, printing means operable in the alternative by manual actuation and in response to said developed control effects for printing information, said printing means including manually actuable character-print key levers and functionally-actuated print-control means selectably positionable in each of two positions for effecting selectable translation of characters in each of two preselected character groups, and means responsive to the positioning of said print-control means in said two positions thereof for rendering said printing means operable at any time only by key levers included within the corresponding one of two different preselected groups thereof.

6. A printing machine for translating functional-control and character-print information comprising, reading means for developing control effects representative of functional-control and character-print information recorded in a record medium, printing means having a plurality of character-print and functional-control key levers each operable in the alternative by manual actuation and by an individual preselected one of said developed control effects for printing information, said printing means including functional-actuated print-control means selectably positionable in each of two positions during information translation operations, and means responsive to the positioning of said print-control means in said two positions thereof for rendering said printing means operable at any time only by a key lever included within a corresponding one of two different preselected groups thereof.

7. A printing machine for translating functional-control and character-print information comprising, reading means for developing control effects representative of functional-control and character-print information recorded in a record medium, printing means having a plurality of character-print and functional-control key levers each operable in the alternative by manual actuation and by an individual preselected one of said developed control effects for printing information, said printing means including functional-actuated print-control means selectably positionable in each of two positions during information translation operations, and means responsive to the positioning of said print-control means in one of said two positions thereof for causing preselected ones of said developed control effects to operate individual ones of character-print key levers included in a first preselected group thereof and responsive to the positioning of said print-control means in the other of said two positions thereof for causing said preselected ones of said developed control effects to operate individual other ones of character-print key levers included in a second preselected group thereof.

8. A printing machine for translating functional-control and character-print information comprising, reading means for developing control effects representative of functional-control and character-print information recorded in a record medium, printing means having two groups of character-print key levers each operable in the alternative by manual actuation and by an individual preselected one of said developed control effects for printing information, said printing means including functional-actuated print-control means selectably positionable in each of two positions during information translation operations, and means responsive to the positioning of said print-control means in one of said two positions thereof for locking one of said groups of key levers against manual actuation while causing preselected ones of said developed control effects to operate individual ones of character-print key levers in the other of said groups thereof and responsive to the positioning of said print-control means in the other of said two positions thereof for locking said other group of key levers against manual actuation while causing said preselected ones of said developed control effects to operate individual ones of character-print key levers included in said one group thereof.

9. A printing machine for translating functional-control and character-print information comprising, reading means for developing control effects representative of functional-control and character-print information recorded in a record medium, printing means including a type basket shiftable to each of two positions and two groups of character-print key levers all operable in the alternative by manual actuation and by an individual preselected one of said developed control effects for printing information, means actuated by said type basket for locking against manual actuation one group of said character-print key levers when said basket is in one of said two positions thereof and the other group of said character-print key levers when said basket is in the other of said two positions thereof, and means actuated by said type basket in said one position thereof for causing preselected ones of said developed control effects to operate individual ones of character-print key levers in said other group thereof and actuated by said type basket in said other position thereof for causing said preselected developed control effects to operate individual ones of character-print key levers in said one group thereof.

10. A printing machine for translating functional-control and character-print information comprising, reading means for developing control effects representative of functional-control and character-print information recorded in a record medium, printing means including a type basket shiftable to each of two positions and two groups of character-print key levers each operable in the alternative by manual actuation and by an individual preselected one of said developed control effects for printing information, and means actuated by said type basket for locking against manual actuation one group of said character-print key levers when said basket is in one of said two positions thereof and the other group of said character-print key levers when said basket is in the other of said two positions thereof.

11. A printing machine for translating functional-control and character-print information comprising, reading means for developing control effects representative of functional-control and character-print information recorded in a record medium, printing means including a type basket shiftable to each of two positions and two groups of character-print key levers each operable in the alternative by manual actuation and by an individual preselected one of said developed control effects for printing information, means for mechanically interlocking the key levers in each group thereof against concurrent multiple key lever actuation, and means actuated by said type basket for controlling said interlocking means additionally to lock against manual actuation one group of said character-print key levers when said basket is in one of said two positions thereof and the other group of said character-print key levers when said basket is in the other of said two positions thereof.

12. A printing machine for translating functional-control and character-print information comprising, reading means for deriving functional-control and character-print information recorded in a record medium by use of a code form having a predetermined number of code levels, code-translation means controlled by said predetermined number of code levels of said derived information and by one additional information code level for developing two groups of multiple control effects in dependence upon the presence and absence of said additional information code level, printing means operable in the alternative by manual actuation and actuation by said code-translation means for printing information, and means included in said printing means for positional actuation by said code-translation means selectively to two positions in response to predetermined functional-control derived information for effectively inserting in one of said positions said additional code level into said code-translation means.

13. A printing machine for translating functional-control and character-print information comprising, reading means for developing control effects representative of functional-control and character-print information recorded in five-level code form in a first medium, printing means operable in the alternative by manual actuation and in response to said developed control effects for printing information, said printing means including a type basket positionable in each of two positions during said information printing operation, and means actuated by said type basket in one of said two positions thereof for converting information read in five-level code form by said reading means to six-level code form for actuation of said printing means.

14. A printing machine for translating functional-control and character-print information comprising, code-translating means controlled by five levels of derived information for developing one group of multiple control effects and controlled by said five levels of derived information combined with a sixth information level for developing a second group of multiple control effects, reading means for reading functional-control and character-print information recorded in five-level code form in a record medium to actuate five levels of said code-translating means, printing means responsive to the control effects developed by said code-translating means for printing information, said printing means including functional-actuated print-control means selectably positionable in each of two positions during information translation operations, and means actuated by said print-control means in one of said two positions thereof for actuating the sixth level of said code-translating means to reproduce said recorded information effectively as though recorded in six-level code form.

15. A printing machine for translating functional-control and character-print information comprising, means for receiving functional-control and character-print information presented by use of a first code form, printing means for printing information in response to operation thereof in the alternative by manual actuation and functional-control and character-print information utilizing a second code form, said first and second code forms having a common code form portion, and code-form converter means included in said printing means and responsive to predetermined received functional-control information for automatically converting said received information from said first code form to said second code form for use by said printing means.

16. A printing machine for translating functional-control and character-print information comprising, reading means for reading a record medium to derive functional-control and character-print information recorded therein by use of a first code form, printing means for printing information in response to operation thereof in the alternative by manual actuation and by functional-control and character-print information utilizing a second code form, said first and second code forms having a common code form portion, and code-form converter means included in said printing means and responsive to preselected functional-control information derived by said reading means from said record medium for automatically converting said derived information from said first code form to said second code form for use by said printing means.

17. A printing machine for translating functional-control and character-print information comprising, reading means for reading a record medium to derive functional-control and character-print information recorded therein by use of a five-level code form, printing means for printing information in response to operation thereof in the alternative by manual actuation and by functional-control and character-print information utilizing a six-level code form, and code-form converter means included in said printing means and responsive to preselected functional-control information derived in five-level code form by said reading means from said record medium for automatically converting said derived information from said five-level code form to said six-level code form for use by said printing means.

18. A printing machine for translating functional-control and character-print information comprising, reading means for reading a record medium to derive functional-control and character-print information recorded therein by use of a first code form, printing means for printing information in response to operation thereof in the alternative by manual actuation and by functional-control and character-print information utilizing a second code form, said first and second code forms having a common code form portion, and code-form converter means included in said printing machine and responsive to two distinctive types of functional-control information derived by said reading means from said record medium for automatically translating to said printing means for use thereby derived information alternatively in said first code form and converted to said second code form.

19. A printing machine for translating functional-control and character-print information comprising, reading means for reading a record medium to derive functional-control and character-print information recorded therein by use of a first code form, printing means for printing information in response to operation thereof in the alternative by manual actuation and by functional-control and character-print information utilizing a second code form, said first and second code forms having a common code form portion, and code-form converter means including print-control means selectably positionable in each of two positions in response to functional-control derived information for automatically translating to said printing means for use thereby derived information alternatively in said first code form and converted to said second code form.

20. A printing machine for translating functional-control and character-print information comprising, reading means for reading a record medium to derive functional-control and character-print information recorded therein by use of a first code form, printing means for printing information in response to operation thereof in the alternative by manual actuation and by functional-control and character-print information utilizing a second code form, said first and second code forms having a common code form portion, and code-form converter means including a type basket selectably positionable in each of two positions in response to functional-control derived information for automatically translating to said printing means for use thereby derived information which has a code form automatically determined by the individual positions of said type basket to be alternatively in said first code form and converted to said second code form.

21. A printing machine for translating functional-control and character-print information comprising, manually operable printing means for printing information while concurrently producing in code form utilizing a predetermined number of code levels functional-control and character-print information required to duplicate said printed information, said functional-control and character-print information being more extensive than can be accommodated by coding only within said predetermined number of code levels, said printing means including manually operable print-control means having either of two operating positions during said printing of information, and means responsive to the positioning of said print-control means in said two positions thereof for producing in said code form two corresponding distinctive forms of functional-control information which effectively convert said code form to one of higher level without actually exceeding said predetermined number of code levels.

22. A printing machine for translating functional-control and character-print information comprising, manually operable printing means for printing information while concurrently producing in code form utilizing a predetermined number of code levels functional-control and character-print information required to duplicate said printed information, said functional-control and character-print information being more extensive than can be accommodated by coding only within said predetermined number of code levels, said printing means including a manually operable type basket having either of two operating positions during said printing of information, and means responsive to the positioning of said type basket in said two positions thereof for producing in said code form two corresponding distinctive forms of functional-control coded information which effectively convert said code form to one of higher code level without actually exceeding said predetermined number of code levels.

23. A printing machine for use with five-level code-punched tape providing functional-control and character-print information comprising, printing means operable in the alternative by manual actuation and in response to translation of said functional-control and character-print information for printing information while concurrently producing in code form utilizing said five code levels functional-control and character-print information required to duplicate said printed information, said functional-control and character-print information being more extensive than can be accommodated by coding only within said five code levels, said printing means including a type basket having either of two operating positions during said printing of information, and means responsive to the positioning of said type basket in said two positions thereof for translating in one of said positions said information in five-level code form while translating in the other position thereof said information effectively in six-level code form without actually exceeding five levels of punched-tape information.

24. A printing machine for translating functional-control and character-print information comprising, reading means for developing control effects representative of functional-control and character-print information recorded in a first record medium, means responsive to control effects representative of functional-control and character-print information for recording said last-mentioned information in a second medium, printing means operable in the alternative by manual actuation and in response to said developed control effects for printing information while concurrently producing and supplying for use by said recording means functional-control and character-print control effects required to duplicate said printed information, said printing means including functional-actuated print-control means selectably positionable in each of two positions during said information printing operations, and means responsive to the positioning of said print-control means in at least one of said two positions thereof for selectably modifying the response of said printing means to said manual actuation and said developed control effects.

25. A printing machine for translating functional-control and character-print information comprising, reading means for developing control effects representative of functional-control and character-print information recorded in a first record medium, means responsive to control effects representative of functional-control and character-print information for recording said last-mentioned information in a second medium, printing means operable in the alternative by manual actuation and in response to said developed control effects for printing information while concurrently producing and supplying for use by said recording means functional-control and character-print control effects required to duplicate said printed information, said printing means including functional-actuated print-control means selectably positionable in each of two positions during said information printing operations, means responsive to the positioning of said print-control means in at least one of said two positions thereof for selectably modifying the response of said printing means to said manual actuation and said developed control effects, and means actuated by nonprint developed control effects for terminating all response of said printing means except that of said print-control means to said developed control effects while conditioning said recording means to be directly responsive to said developed control effects and subsequently actuated by print-restore developed control effects for restoring the response of said printing means to said developed control effects while conditioning said recording means to be responsive to said control effects produced by said printing means.

26. A printing machine for translating functional-control and character-print information comprising, reading means for developing control effects representative of functional-control and character-print information recorded in a first record medium, means responsive to control effects representative of functional-control and character-print information for recording said last-mentioned information in a second medium, printing means operable in the alternative by manual actuation and in response to said developed control effects for printing information while concurrently producing and supplying for use by said recording means functional-control and character-print control effects required to duplicate said printed information, said printing means including functional-actuated print-control means selectably positionable in each of two positions during said information printing operations, means responsive to the positioning of said print-control means in at least one of said two positions thereof for selectably modifying the response of said printing means to said manual actuation and said developed control effects, and means actuated by successive nonprint and print-restore developed control effects for successively terminating and restoring all functions of said printing means except that of said print-control means while concurrently transferring the input to said recording means successively between the control-effect outputs of said reading means and said printing means.

27. A printing machine comprising, a code information reader for deriving information recorded in a first record medium, a recorder for recording coded information in a second medium, printing means operable in the alternative by manual actuation and in response to said derived information for printing information while concurrently producing coded information required to duplicate said printed information, a code translator controlled by said reading means to control said printing means, said printing means including functionally actuated print-control means selectably positionable in two operating positions during information translating operations and effective in said two positions thereof to control said code translator to modify the response of said printing means to said manual actuation and to said derived information, and means actuated by successive nonprint and print-restore derived information for controlling said translator successively to termintae and restore all functions of said printing means except that of said print-control means while concurrently transferring the control over said recorder successively between said reading means and said printing means.

28. A printing machine for translating functional-control and character-print information comprising, reading means for reading successively presented codes recorded in a record medium and representative of functional-control and character-print information required to duplicate printed information, each of a plurality of said codes being used in identical form to record two different items of said information but being preceded in said recording by one of two distinctive codes which with said each code selectively identifies which one of said two items is recorded, printing means responsive to said read codes for duplicating said printed information, and means positionally controlled by said distinctive codes for controlling the operation of said printing means selectively to identify an individual one of said two items of information recordable by each of said plural codes and thereby resolve the ambiguity created by said duality of use of said plural codes.

29. A printing machine for translating functional-control and character-print information comprising, reading means for reading successively presented codes recorded in a record medium and representative of functional-control and character-print information required to duplicate printed information, each of a plurality of said codes being used in identical form to record two different items of said information but being preceded in said recording by one of two distinctive codes which with each code selectively identifies which one of said two items is recorded, printing means responsive to said read codes for duplicating said printed information, means included in said printing means and positionally controlled in response to reading said distinctive codes for selectively controlling the printing of predetermined groups of character-print information, and means controlled by said last-mentioned means for selectively identifying an individual one of said two items of information recordable by each of said plural codes to resolve the ambiguity created by said duality of use of said plural codes.

30. A printing machine for translating functional-control and character-print information comprising, reading means for reading successively presented codes recorded in a record medium and representative of functional-control and character-print information required to duplicate printed information, each of a plurality of said codes being used in identical form to record two different items of said information but being preceded in said recording by one of two distinctive codes which with said each code selectively identifies which one of said two items is recorded, printing means responsive to said read codes for duplicating said printed information, means positionally controlled by said distinctive codes for controlling the operation of said printing means selectively to identify an individual one of said two items of information recordable by each of said plural codes and thereby resolve the ambiguity created by said duality of use of said plural codes, and means controlled by said last-named means for controlling predetermined functional operations of said printing means in conformity with selective identification of functional-control and character-print items of information recorded by each of predetermined ones of said plural codes.

31. A printing machine for translating functional-control and character-print information comprising, reading means for reading successively presented codes recorded in a record medium and representative of functional-control and character-print information required to duplicate printed information, each of a plurality of said codes being used in identical form to record two different items of said information but being preceded in said recording by one of two distinctive codes which with said each code selectively identifies which one of said two items is recorded, means for printing information, code-translating means responsive to said read codes for controlling said printing means to duplicate said printed information, print-control means controlled by said code-translating means and having two operating conditions in response to said distinctive codes, and means responsive to said two operating conditions of said print-control means for controlling said code-translating means selectively to identify an individual one of said two items of information recordable by each of said plural codes and thereby resolve the ambiguity created by said duality of use of said plural codes.

32. A printing machine for translating functional-control and character-print information comprising, reading means for reading successively presented codes recorded in a record medium and representative of functional-control and character-print information required to duplicate printed information, each of a plurality of said codes being used in identical form to record two different items of said information but being preceded in said recording by one of two distinctive codes which with said each code selectively identifies which one of said two items is recorded, means for printing information, code-translating means responsive to said read codes for controlling said printing means to duplicate said printed information, said printing means including print-control means controlled by said code-translating means and selectably positionable in each of two positions in response to said distinctive codes, and means responsive to the positions of said print-control means for controlling said code-translating means selectively to identify an individual one of said two items of information recordable by each of said plural codes and thereby resolve the ambiguity created by said duality of use of said plural codes.

33. A printing machine for translating functional-control and character-print information comprising, reading means for reading successively presented codes recorded in a record medium and representative of functional-control and character-print information required to duplicate printed information, each of a plurality of said codes being used in identical form to record two different items of said information but being preceded in said recording by one of two distinctive codes which with said each code selectively identifies which one of said two items is recorded, means for printing information, code-translating means responsive to said read codes for controlling said printing means to duplicate said printed information, said printing means including a type basket movable during printing operations to either of two positions under control of said code-translating means and in response to said distinctive codes, and means responsive to the positioning of said type basket in said two positions thereof for controlling said code-translating means selectively to identify an individual one of said two items of information recordable by each of said plural codes and thereby resolve the ambiguity created by said duality of use of said plural codes.

34. A printing machine for translating functional-control and character-print information comprising, reading means for reading successively presented codes recorded in a first medium and representative of functional-control and character-print information required to duplicate printed information, each of a plurality of said codes being used in identical form to record two different items of said information but being preceded in said recording by one of two distinctive codes which with said each code selectively identifies which one of said two items is recorded, a plurality of recording means for recording in record media codes representative of functional-control and character-print information required to duplicate printed information, printing means operable in the alternative by manual actuation and actuation under control of said reading means for printing information, print-control means positionally controlled by said distinctive codes for controlling the operation of said printing means selectively to identify an individual one of said two items of information recordable by each of said plural codes and thereby resolve the ambiguity created by said duality of use of said plural codes, and means controlled by the positioning of said print-control means for selectively rendering each of said recording means responsive and nonresponsive to coded information supplied thereto for recording by one of said printing means and reading means.

35. A printing machine for translating functional-control and character-print information comprising, reading means for reading successively presented codes recorded in a record medium and representative of functional-control and character-print information required to duplicate printed information, each of a plurality of said codes being used in identical form to record two different items of said information but being preceded in said recording by one of two distinctive codes which with said each code selectively identifies which one of said two items is recorded, printing means responsive to said read codes for duplicating said printed information, a plurality of recording means for recording in record media codes representative of functional-control and character-print information required to duplicate printed information, a type basket included in said printing means and positionally controlled by said distinctive codes for controlling the operation of said printing means selectively to identify an individual one of said two items of information recordable by each of said plural codes and thereby resolve the ambiguity created by said duality of use of said plural codes, and means controlled by the positioning of said type basket for selectively rendering each of said recording means responsive and non-responsive to coded information supplied thereto for recording at any given time by one of said printing means and reading means.

36. A printing machine for translating functional-control and character-print information comprising, reading means for developing control effects representative of functional-control and character-print information recorded in a record medium, printing means including manually operable key levers for printing information, a translator responsive to said control effects for automatically actuating said key levers to reproduce said information of said record medium, said printing means including functional-actuated print-control means selectably operable to each of two positions during information translation operations, and means actuated by successive nonprint and print-restore developed control effects for controlling said translator through said print-control means to render said key levers nonoperable during each nonprint operation.

37. A printing machine comprising plural type elements carried by a type basket selectively movable to each of two positions for printing by selectable actuation of said type elements each of two selectable groups of character-print information; basket-shift means for moving said basket to each of said two positions thereof; power driving means; means including manually operable character-print key levers and manually operable basket-shift key levers for effecting selective driving engagement between said power driving means, said basket-shift means, and individual ones of said type elements; and means actuated by said power driving means in response to the positioning of said basket for locking against actuation one group of said character-print key levers when said basket is in one of said two positions thereof and the other group of said character-print key levers when said basket is in the other of said two positions thereof.

38. A printing machine comprising plural type elements carried by a type basket selectively movable to each of two positions for printing by selectable actuation of said type elements each of two selectable groups of character-print information; basket-shift means for moving said basket to each of said two positions thereof; power driving means; means including manually operable character-print key levers and manually operable basket-shift key levers for effecting selective driving engagement between said power driving means, said basket-shift means, and individual ones of said type elements; means for mechanically interlocking said character-print key levers against multiple concurrent key lever actuation and to provide actuation thereof selectably in two groups corresponding to individual ones of said two basket positions; and means actuated by said power driving means in response to the positioning of said basket in said two positions thereof for controlling said interlocking means to select a corresponding individual one of said key lever groups for actuation.

39. A printing machine comprising plural type elements carried by a type basket selectively movable to each of two positions for printing by selectable actuation of said type elements each of two selectable groups of character-print information; basket-shift means for moving said basket to each of said two positions thereof; power driving means; means including manually operable character-print key levers and manually operable basket-shift key levers for effecting selective driving engagement between said power driving means, said basket-shift means, and individual ones of said type elements; means including plural members constrained in two groups thereof for limited lateral movement by any actuated character-print key lever including in one of two corresponding key lever groups for interlocking against multiple concurrent actuation the key levers of each said group; and an articulated lock lever actuated with said basket-shift means in response to the positioning of said basket in said two positions thereof for inserting individual ones of two lock lever portions alternately in said groups of interlocking members with alternate positioning of said basket to select an individual one of said key lever groups for actuation.

40. A printing machine comprising plural type elements carried by a type basket selectively movable to each of two positions for printing by selectable actuation of said type elements each of two selectable groups of character-print information; basket-shift means for moving said basket to each of said two positions thereof; power driving means; means including manually operable character-print key levers and manually operable basket-shift key levers for effecting selective driving engagement between said power driving means, said basket-shift means, and individual ones of said type elements; means including plural members constrained in two groups thereof for limited lateral movement by any actuated character-print key lever included in one of two corresponding key lever groups for interlocking against multiple concurrent actuation the key levers of each said group; and an articulated lock lever biased against articulation and to a preselected position corresponding to a preselected one of said positions of said basket and actuated with said basket-shift means in response to the positioning of said basket in said two positions thereof for restrainably inserting individual ones of two lock lever portions alternately in said groups of interlocking members with alternate positioning of said basket to select an individual one of said key lever groups for actuation.

41. A printing machine for translating functional-control and character-print information comprising, reading means for developing control effects representative of functional-control and character-print information recorded in a record medium, printing means including a type basket shiftable to each of two positions and two groups of character-print key levers all operable in the alternative by manual actuation and by an individual preselected one of said developed control effects for printing information, means responsive to the positioning of said type basket in said two positions thereof for locking against manual actuation one group of said character-print key levers when said basket is in one of said two positions thereof and the other group of said character-print key levers when said basket is in the other of said two positions thereof, and means responsive to the positioning of said type basket in said one position thereof for causing preselected ones of said developed control effects to operate individual ones of character-print key levers in said other group thereof and responsive to the positioning of said type basket in said other position thereof for causing said preselected developed control effects to operate individual ones of said character-print key levers in said one group thereof.

References Cited in the file of this patent

UNITED STATES PATENTS

| | | |
|---|---|---|
| 2,240,562 | Lake et al. | May 6, 1941 |
| 2,320,637 | Modigliani | June 1, 1943 |
| 2,461,451 | Tholstrup | Feb. 8, 1949 |